(12) United States Patent
Noda

(10) Patent No.: US 6,428,089 B1
(45) Date of Patent: Aug. 6, 2002

(54) MOUNT FOR ASSIST GRIP

(75) Inventor: Hozumi Noda, Hiroshima (JP)

(73) Assignee: Nishikawa Kasei Co., Ltd., Hiroshima (JP)

( * ) Notice: Subject to any disclaimer, the term of this patent is extended or adjusted under 35 U.S.C. 154(b) by 0 days.

(21) Appl. No.: 09/907,912

(22) Filed: Jul. 19, 2001

(30) Foreign Application Priority Data

Oct. 17, 2000 (JP) ...................................... 2000-316727

(51) Int. Cl.$^7$ ................................................. B60N 3/02
(52) U.S. Cl. ........................................ 296/214; 411/45
(58) Field of Search ........................... 296/159, 203.03, 296/210, 214; 16/110.1, 114.1, DIG. 24; 411/45, 60.1

(56) References Cited

U.S. PATENT DOCUMENTS

| | | | |
|---|---|---|---|
| 4,912,808 A | | 4/1990 | Blakely |
| 4,981,322 A | | 1/1991 | Dowd et al. |
| 5,403,064 A | * | 4/1995 | Mahler et al. ........... 296/214 X |
| 5,662,375 A | * | 9/1997 | Adams et al. ............. 16/110.1 |
| 5,920,957 A | * | 7/1999 | Wagner .................. 296/214 X |
| 6,178,605 B1 | * | 1/2001 | Magarino et al. ............. 24/292 |
| 6,220,645 B1 | * | 4/2001 | Didier ........................ 296/214 |
| 6,223,395 B1 | * | 5/2001 | Miho et al. .................... 16/429 |

FOREIGN PATENT DOCUMENTS

| | | |
|---|---|---|
| DE | 42 24 148 | 1/1994 |
| EP | 0 798 159 | 10/1997 |
| JP | 05-40032 | 5/1993 |
| JP | 10-24759 | 1/1998 |
| JP | 2001280315A A * | 3/2000 |
| JP | 2001-47922 | 2/2001 |

OTHER PUBLICATIONS

Notice of Reasons of Rejection dated Jun. 19, 2001.
European Search Report, Application No. 01116440.7–2424, Jan. 29, 2002.

* cited by examiner

*Primary Examiner*—Dennis H. Pedder
*Assistant Examiner*—Jason Morrow
(74) *Attorney, Agent, or Firm*—Nixon Peabody LLP; Donald R. Studebaker

(57) ABSTRACT

A pair of mounts 3A and 3B for an assist grip G each include a pair of engaging pieces 19 which are pushed apart from each other by press-insertion of a locking member 23 between them and thereby engaged on the edge of a panel opening p1 of an inner panel P. On at least one of both sides of the mount 3A (3B) where the pair of engaging pieces 19 are located, a provisional retention piece 20 is provided which is independent of and separated from the engaging piece 19. In mounting the assist grip G to the inner panel P through the panel opening p1, the provisional retention piece is inserted together with the engaging pieces 19 into the panel opening p1 and thereby engaged on the edge of the panel opening p1 to provisionally retain the mount 3A (3B) onto the inner panel P. This provides ease and reliable provisional retention and full retention of the mount with a small force.

4 Claims, 14 Drawing Sheets

MOUNT FOR ASSIST GRIP

TECHNICAL FIELD

This invention relates to a mount for an assist grip equipped in a passenger room of a vehicle.

BACKGROUND ART

Assist grips for vehicles are broadly classified as retractable type and fixed type. The former retractable assist grip includes a grip body with legs at both lengthwise ends and a pair of mounts onto which the corresponding legs of the grip body are mounted for swing motion. Thus, with the mounts attached to a car body panel through respective panel openings, the retractable assist grip can be swung between its retracted position and use position.

As a retractable assist grip of such kind, there is known an assist grip as for example disclosed in U.S. Pat. No. 4,981, 322 which aims at easily and readily mounting the assist grip in the panel openings. In this assist grip, a mount body of each mount is formed with a through hole and a pair of engaging pieces each having a pawl at the distal end thereof are extended from the periphery of the through hole on the back of the mount body.

In mounting this assist grip to the car body panel through the panel openings, the mounts are presented to the corresponding panel openings of the car body panel, the pairs of engaging pieces are inserted into the corresponding panel openings, respectively, and the mount bodies are caused to abut on the peripheries of the corresponding panel openings from the front side of the car body panel. Then, locking members are inserted into the through holes of the mount bodies from the front side of the car body panel, respectively, and in this state, the grip body is swung in its retracted direction to press-insert each of the locking members between the pair of engaging pieces through the corresponding through hole of the mount body. Each of the press-inserted locking members pushes the pair of engaging pieces apart from each other so that the pawls of the engaging pieces are engaged on the periphery of the panel opening from the back side of the car body panel. Thus, the car body panel is secured in sandwich relation between the mount bodies and the pawls.

The latter fixed type assist grip has a monolithic construction in which legs at both ends of a grip body are mounted at lower ends thereof to corresponding mounts against swing motion. The assist grip is held against movement in a state where it is mounted in the panel openings of the car body panel through the mounts. Among the fixed type assist grips, there also exists one which employs the mounts and locking members having the above-described structures. In this case, though, unlike the retractable type one, the locking member is manually press-inserted, by using a pressing jig, between the engaging pieces through the through hole of the mount body, the assist grip is mounted in the panel openings through the same engagement mechanism as employed by the retractable assist grip.

For the mounts of these assist grips, in inserting the engaging pieces of the mount into each of the panel openings in order to mount the assist grip in the panel openings, it is desirable in terms of smooth mounting work to make the mount provisionally retained by engaging the pawl of the engaging piece on the periphery of the panel opening so as to hold the mount against disengagement from the panel opening in the inserted position of the engaging pieces.

To implement such provisional retention of the mount, the distance between the pawls of the pair of engaging pieces must be longer than the width of the panel opening in an unconstrained position of the engaging pieces where they are not yet pushed apart from each other by the locking member.

With this structure, in inserting the pair of engaging pieces into the panel opening, the engaging pieces are passed through the panel opening by moving the engaging pieces in a direction to approach each other to narrow the distance between the engaging pieces while slidingly contacting their pawls with the edge of the panel opening. After the passage through the panel opening, the engaging pieces are moved apart from each other by their own restoring forces so that the pawls thereof engage the periphery of the panel opening, thereby implementing provisional retention.

However, since the engaging piece has a substantially high rigidity due to the need for ensuring mounting strength, performing provisional retention in the above manner involves a substantially large force to insert the engaging pieces into the panel opening. This invites decreased working efficiency. Further, also in the later press-insertion of the locking member between the engaging pieces for full retention for fully fixing the provisionally retained mount to the panel, the high rigidity of the engaging pieces requires a substantially large force to press the locking member in between them. This invites further decreased working efficiency.

If the rigidity of the engaging piece is lowered to cope with the above shortcomings, the provisional retention property and mounting strength of the mount would be degraded, though insertion of the engaging pieces and press-insertion of the locking member could be implemented easily.

The present invention has been made in view of the foregoing points and therefore has its object of providing simple and reliable provisional and full retention of the mount with a small force.

DISCLOSURE OF INVENTION

To achieve the above object, the present invention is characterized by providing a dedicated provisional retention piece in addition to the engaging pieces.

Specifically, the present invention is directed to a mount for an assist grip wherein the assist grip includes: a grip body with legs at both lengthwise ends; a pair of mounts each having a mount body onto which one of the legs of the grip body is mounted for or against swing motion, the mount body being provided with a pair of engaging pieces extending lengthwise of the grip body; and a locking member for locking and holding the engaging pieces in position apart from each other through press-insertion thereof between the pair of engaging pieces to move the engaging pieces apart from each other, and wherein when the assist grip is mounted to a car body panel through panel openings of the car body panel, the pair of engaging pieces are inserted into the corresponding panel opening and the locking member is then press-inserted between the pair of engaging pieces so that the engaging pieces moved apart from each other by the press-insertion of the locking member are held engaged on the edge of the panel opening. The present invention takes the following solutions.

A solution taken in the invention of Claim 1 is characterized in that on at least one of both sides of the mount body where the pair of engaging pieces are located, a provisional retention piece is provided which is independent of and separated from the engaging piece, and in mounting the assist grip to the car body panel through the panel openings, the provisional retention piece is inserted together with the engaging pieces into the corresponding panel opening and thereby engaged on the edge of the panel opening to provisionally retain the mount onto the car body panel.

With the above structure of the invention of Claim 1, since provisional retention of the mount is made by the retention piece, the pair of engaging pieces need only a function of fully retaining the mount. Therefore, if the engaging pieces are set to come into slight or no contact with the edge of the panel opening when inserted into the panel opening, they scarcely experience resistance to insertion but the provisional retention piece exclusively experiences it. Accordingly, the provisional retention piece can be smaller in size than the engaging piece in consideration of its function. Consequently, even if the provisional retention piece of small size has a high rigidity, it is easily flexed as compared with the case of making provisional retention by using the engaging pieces entirely without a dedicated provisional retention piece and provides ease and reliable provisional retention of the mount with a small insertion, resulting in increased working efficiency.

Further, at the full retention of the mount after the provisional retention, the locking member is press-inserted between the pair of engaging pieces so that the engaging pieces are moved apart from each other. The engaging pieces are thus engaged on the edge of the panel opening for the first time. In this case, the provisional retention piece needs only a function of provisionally retaining the mount. Therefore, if the locking member is set to come into slight or no contact with the provisional retention piece when press-inserted between the engaging pieces, the provisional retention piece scarcely experiences resistance to insertion but the engaging pieces exclusively experience it. Accordingly, the engaging piece can be smaller in size by a portion corresponding to the provisional retention piece as compared with the case of using the engaging pieces only without the provisional retention piece. Consequently, even if the engaging piece of small size has a high rigidity, it is easily flexed and provides ease and reliable full retention of the mount with a small insertion, resulting in increased working efficiency.

Another solution taken in the invention of Claim 2 is characterized, in the invention of Claim 1, in that at least one of the pair of engaging pieces is provided with an engaging pawl, the engaging pawl extending lengthwise of the engaging piece, projecting in a direction orthogonal to the lengthwise direction of the engaging piece and engaging the periphery of the panel opening, and the provisional retention piece is provided with a provisional retention pawl, the provisional retention pawl projecting in the same direction of projection of the engaging pawl and engaging the periphery of the panel opening.

With the above structure of the invention of Claim 2, an embodiment is provided which shows an exemplary positional relationship between the engaging pawl of the engaging piece and the provisional retention pawl of the provisional retention piece.

A still another solution taken in the invention of Claim 3 is characterized, in the invention of Claim 1, in that at least one of the pair of engaging pieces is provided with an engaging pawl, the engaging pawl extending lengthwise of the engaging piece, projecting in a direction orthogonal to the lengthwise direction of the engaging piece and engaging the periphery of the panel opening, and the provisional retention piece is provided with a provisional retention pawl, the provisional retention pawl projecting lengthwise of the at least one engaging piece and engaging the periphery of the panel opening.

With the above structure of the invention of Claim 3, another embodiment is provided which shows another exemplary positional relationship between the engaging pawl of the engaging piece and the provisional retention pawl of the provisional retention piece.

A still another solution taken in the invention of Claim 4 is characterized, in the invention of any one of Claims 1 to 3, in that the locking member is provided with a stop which is abuttable, when the assist grip is mounted to the cap body panel through the panel openings, on a back face of the provisional retention piece to block movement of the provisional retention piece opposite to a direction of engagement.

With the above structure of the invention of Claim 4, the function of fully retaining the mount is added to the provisional retention piece and therefore the mounting strength for the mount can be increased.

MODES FOR CARRYING OUT THE INVENTION

Embodiments of the present invention will be described below with reference to the drawings.

(Embodiment 1)

FIGS. 1 to 7 shows a retractable assist grip G for a vehicle. This assist grip G includes a resin-made, elongated grip body 1 moulded by using polypropylene (PP) or the like as a source material, and resin-made mounts 3A and 3B according to Embodiment 1 of the invention that has been moulded by using polyacetal (POM) or the like as a source material. The grip body 1 is separate from the mounts 3A and 3B. The grip body 1 has an approximately bracket-like section and has a pair of legs 5, 5 at both lengthwise ends. One (left-hand one in FIG. 7) of the legs 5 is pivotally mounted to the mount 3A, while the other leg 5 (right-hand one in FIG. 7) is pivotally mounted to the other mount 3B. Though the mounts 3A and 3B have different hinge structures (see FIG. 7), they have below-mentioned common features. Therefore, common parts of the mount 3A will be described in substitution for those of the mount 3B.

Figure 11:
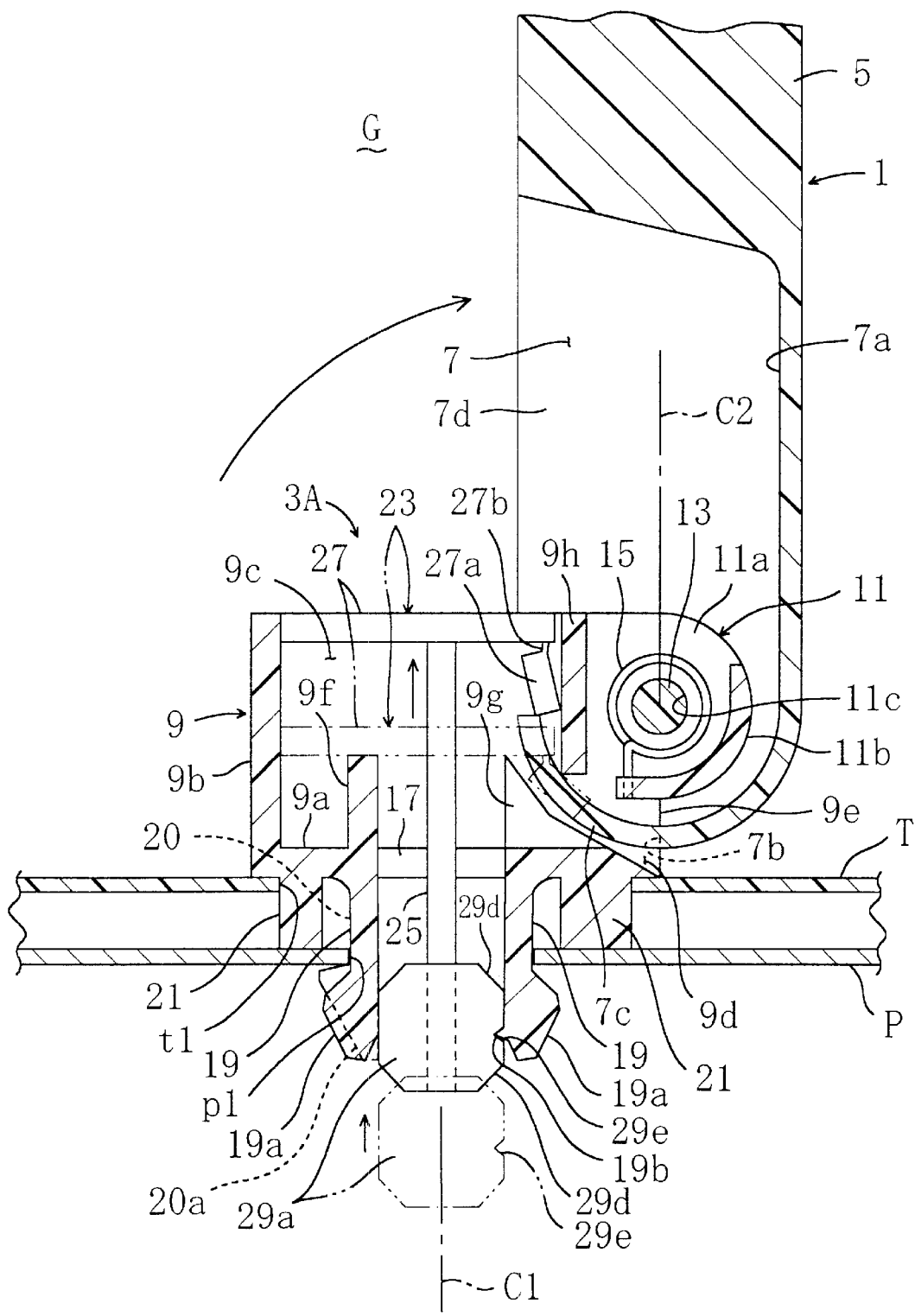
FIG. 11 is a cross-sectional view taken along the line VIII—VIII of FIG. 2 for illustrating the state that the grip body has been swung to its use position so that the mounting of the assist grip to an inner panel has been completed.
Figure 12:
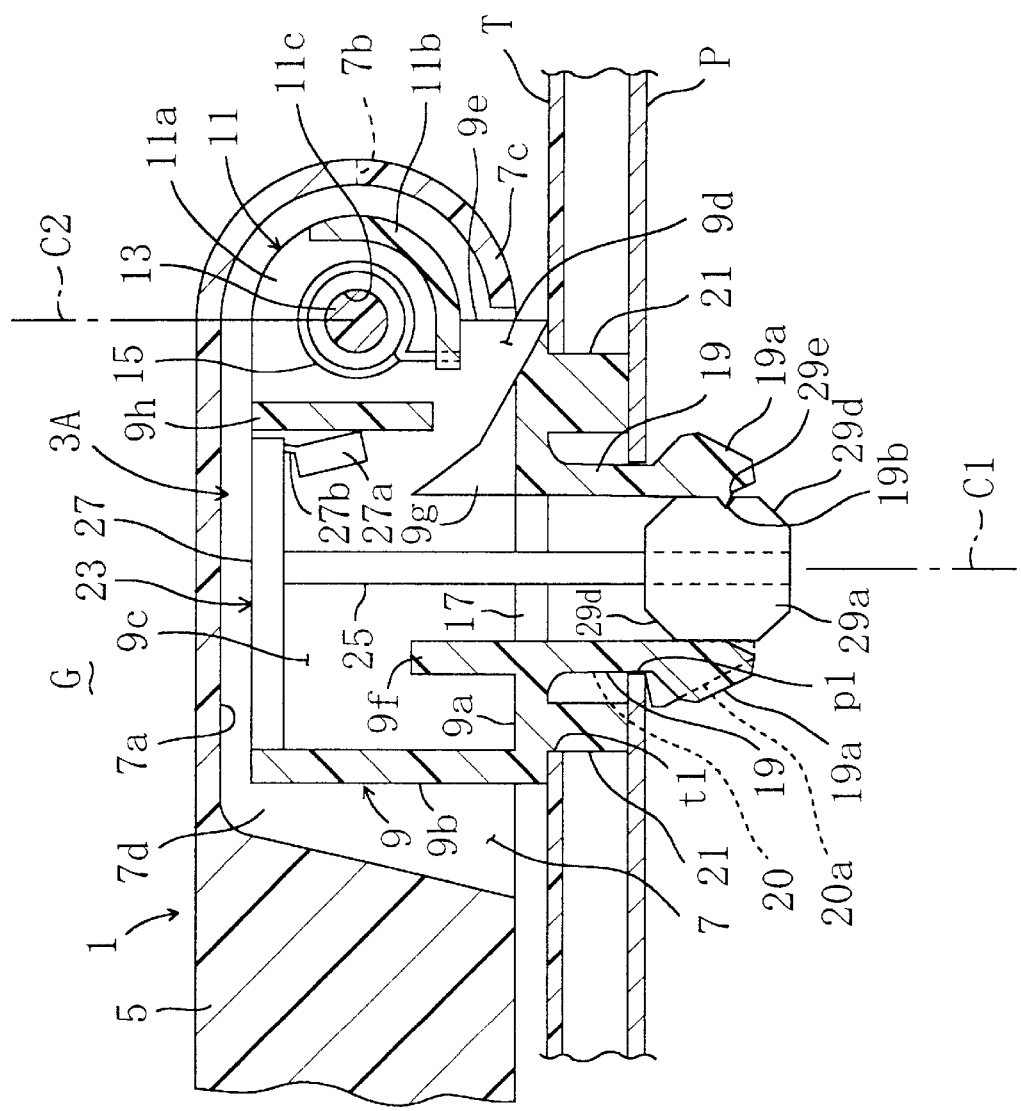
FIG. 12 is a cross-sectional view taken along the line VIII—VIII of FIG. 2 for illustrating a retracted position of the grip body.
Figure 13:
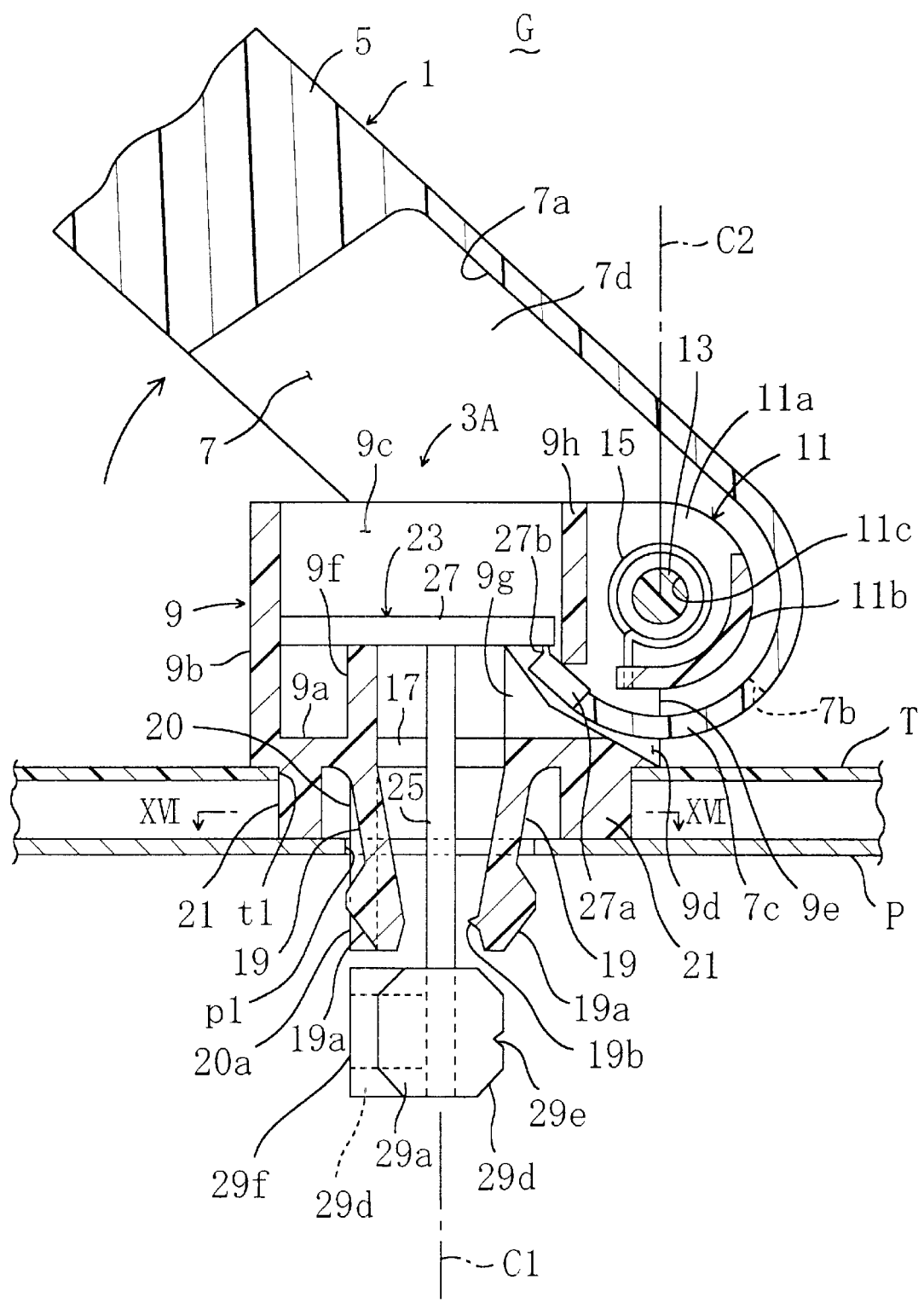
FIG. 13 is a view showing a cross-sectional configuration of a mount for an assist grip according to Embodiment 2 of the invention which is taken along the line XIII—XIII of FIG. 16 and corresponds to FIG. 10.
Figure 14:
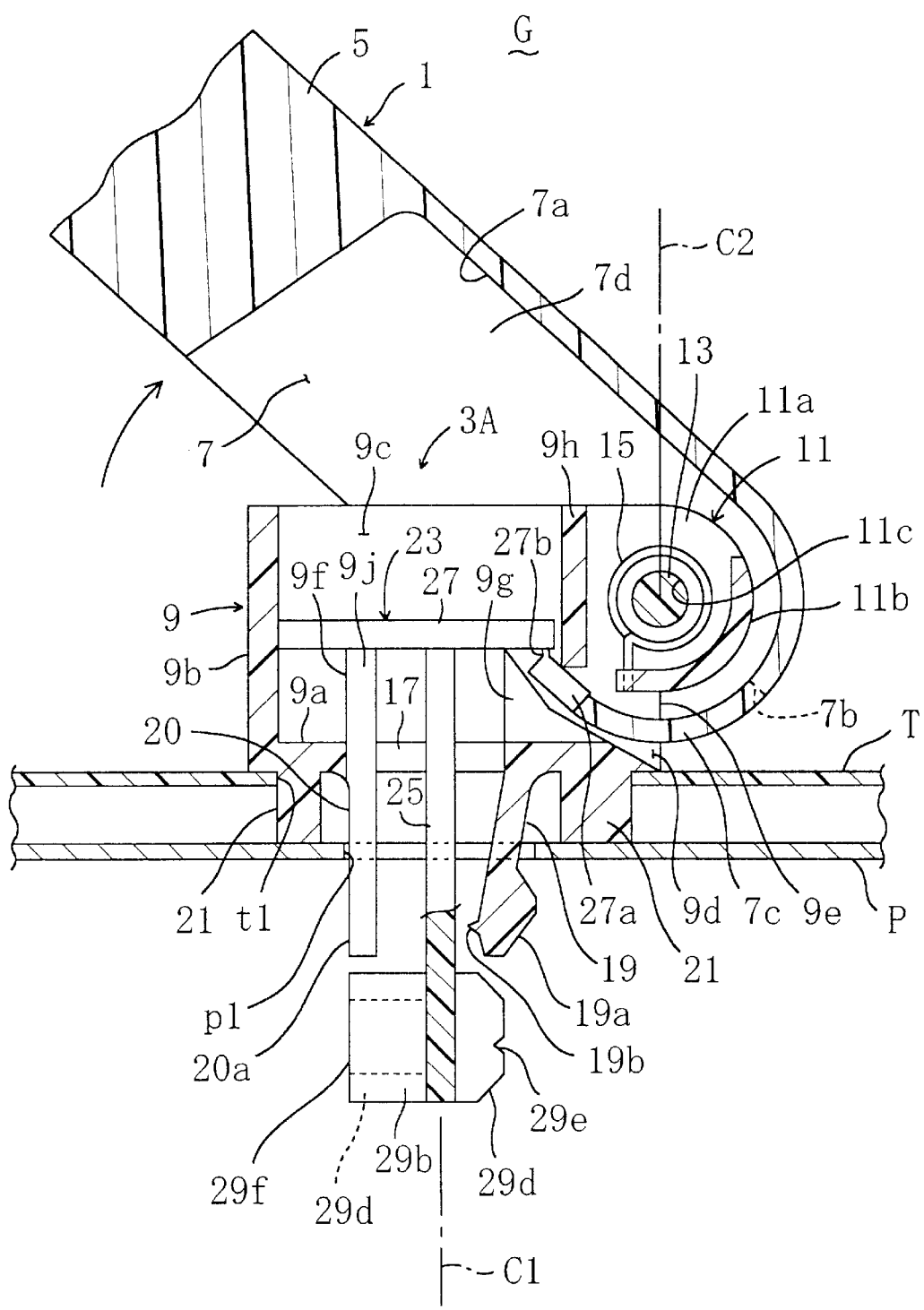
FIG. 14 is a view showing a cross-sectional configuration of the mount for an assist grip according to Embodiment 2 of the invention which is taken along the line XIV—XIV of FIG. 16 and corresponds to FIG. 10.
Figure 15:
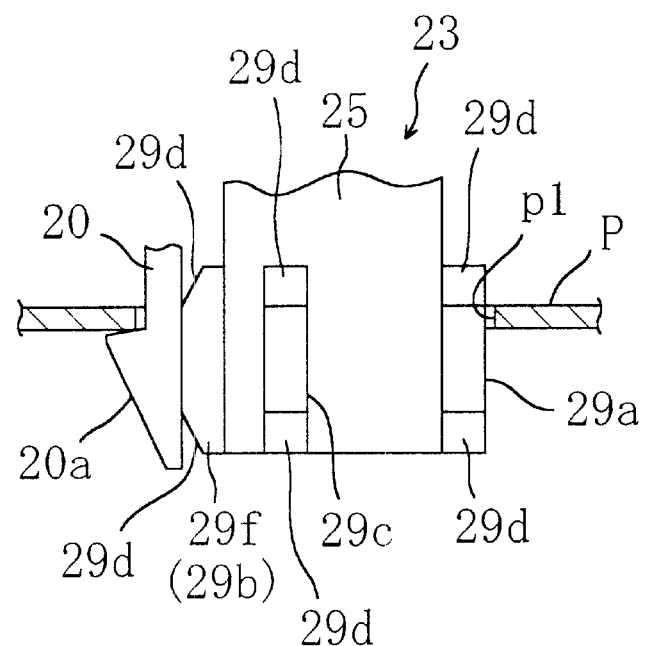
FIG. 15 is a view when viewed in the direction of arrow B of FIG. 16 for illustrating the state that a provisional retention piece is backed up by a stop of a locking member.
Figure 16:
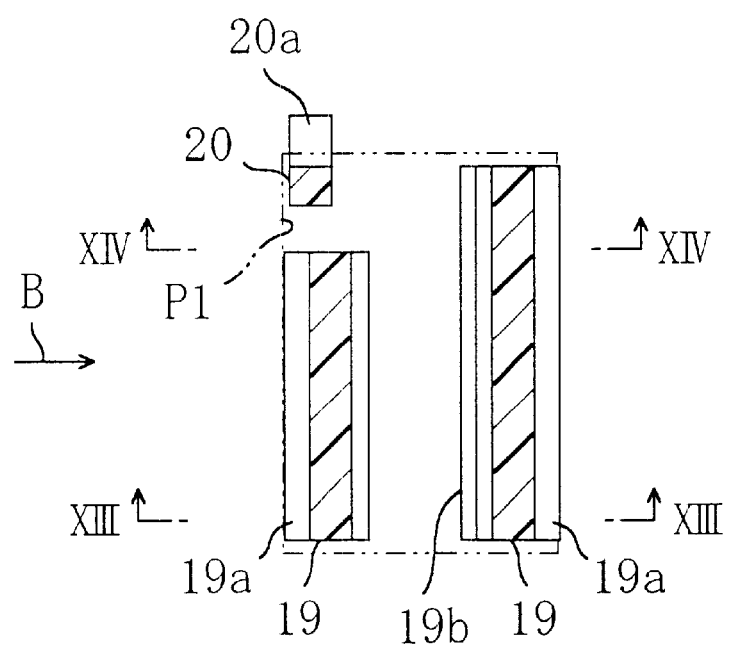
FIG. 16 is a cross-sectional view taken along the line XVI—XVI of FIG. 13 for illustrating the positional relationship among engaging pieces, a provisional retention piece and a panel opening.
Figure 17:
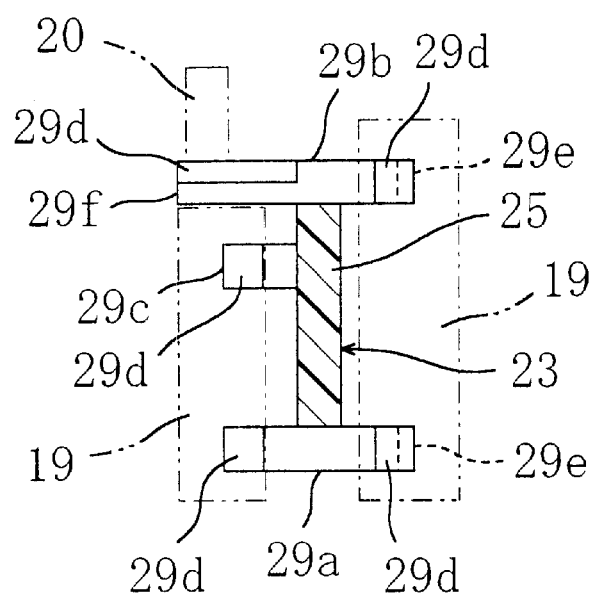
FIG. 17 is a cross-sectional view taken along the line XVI—XVI of FIG. 13 for illustrating the positional relationship among the engaging pieces, the provisional retention piece and the locking member.
Figure 18:
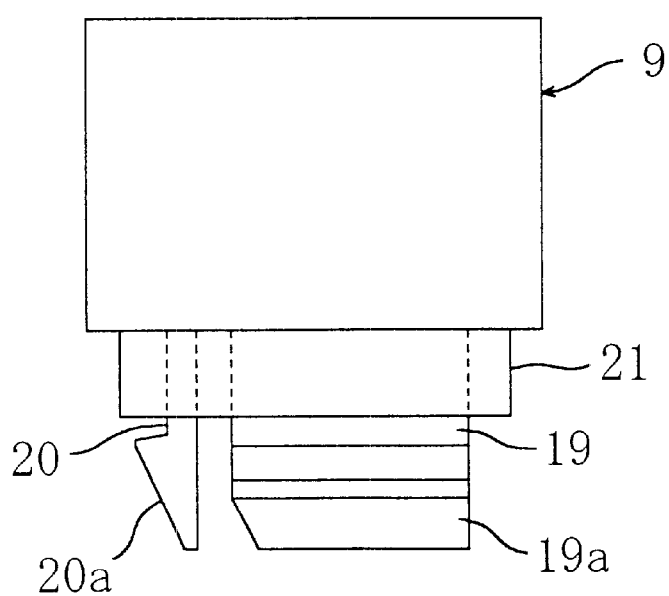
FIG. 18 is a side view of a mount when viewed in the direction of arrow B of FIG. 16.

The assist grip G is mounted to an inner panel P as a car body panel through the above-mentioned two mounts 3A and 3B. The inner panel P is covered with a ceiling member T as internal trim part. At a position of the inner panel P at which the assist grip is mounted, two rectangular panel openings p1 are formed one for each of the two legs 5 of the assist grip G so as to be spaced apart from each other by a distance between the two legs 5. Also at a position of the ceiling member T at which the assist grip is mounted, two rectangular openings t1 larger in diameter than the panel openings p1 are formed one for each of the two legs 5 of the assist grip G so as to be spaced apart from each other by a distance between the two legs 5. The mounts 3A and 3B are mounted in the two panel openings p1 of the inner panel P, respectively. In this mounted condition, the grip body 1 is swung between its retracted and use positions. The retracted position here refers to, as shown in FIG. 12, a position in which the grip body 1 is directed upward (leftward in FIG. 12) and lies along the ceiling member T having substantially a perpendicular surface, and the use position refers to, as shown in FIG. 11, a position in which the grip body 1 is directed toward the passenger room and substantially lies along a horizontal surface.

Figure 6:
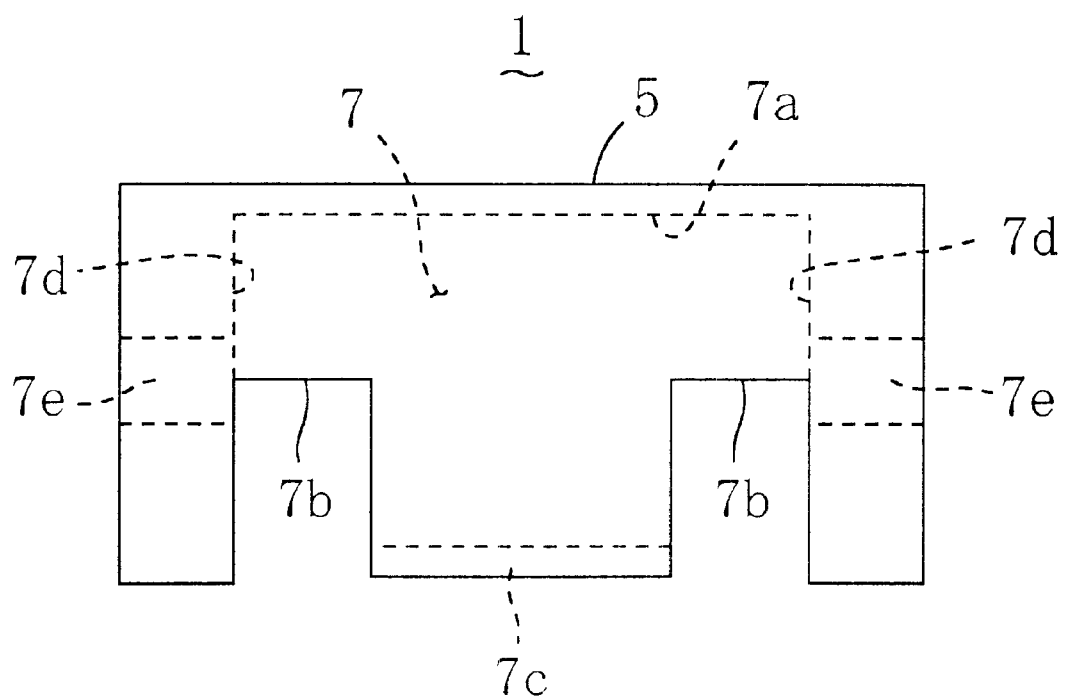
FIG. 6 is a bottom view of a leg of a grip body.

An accommodating section 7 is formed on the back of the leg 5 of the grip body 1 (on the side thereof opposed to the ceiling member T in the retracted position of the assist grip) so as to be recessed in an approximately rectangular shape upwardly from the bottom end of the leg 5. In the retracted position of the assist grip, the leg 5 is held against interference with the mount 3A, 3B by accommodating in the accommodating section 7 a hereinafter described mount body 9 of the mount 3A, 3B extending toward the passenger room from the ceiling member T. As shown in FIG. 6, the bottom end of the leg 5 is cut away, at two portions thereof, in a rectangular shape to form abutments 7b as swing stops for holding the grip body 1 in a horizontal attitude at its use position. A portion of the leg 5 between the two abutments 7b constitutes a pusher 7c which turns toward the opening side of the accommodating section 7 to push up a hereinafter described locking member 23 in the opposite direction of its insertion into a through hole 17 described later. The structures described so far are common to the right- and left-hand legs 5. However, the hinge structures for mounting the grip body 1 for swing motion to the mounts 3A and 3B are slightly different between the right- and left-hand legs 5.

Specifically, in each of the right- and left-hand legs 5, two laterally opposed sidewalls 7d of the accommodating section 7 act as pin supports. The two sidewalls 7d of the left-hand leg 5 as viewed in FIG. 7 are provided with opposed support holes 7e as through holes, respectively, while the two sidewalls 7d of the right-hand leg 5 as viewed in FIG. 7 are formed with a through spacer fitting hole 7f of larger diameter and a bottomed support bore 7g of smaller diameter, respectively, so as to be opposed to each other.

Figure 1:
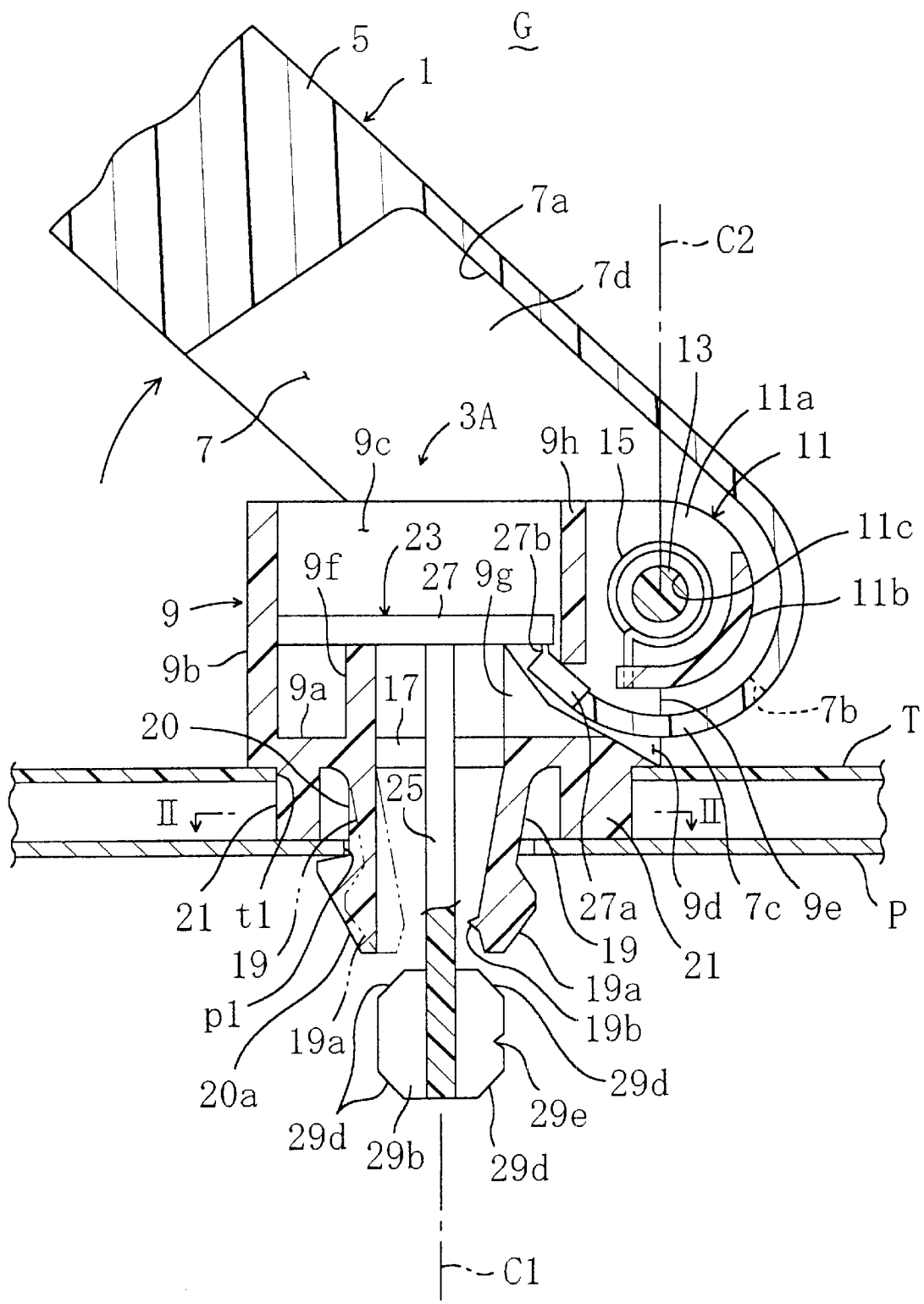
FIG. 1 is a view showing a cross-sectional configuration of a mount for an assist grip according to Embodiment 1 of the invention which is taken along the line I—I of FIG. 2 and corresponds to FIG. 10.
Figure 7:
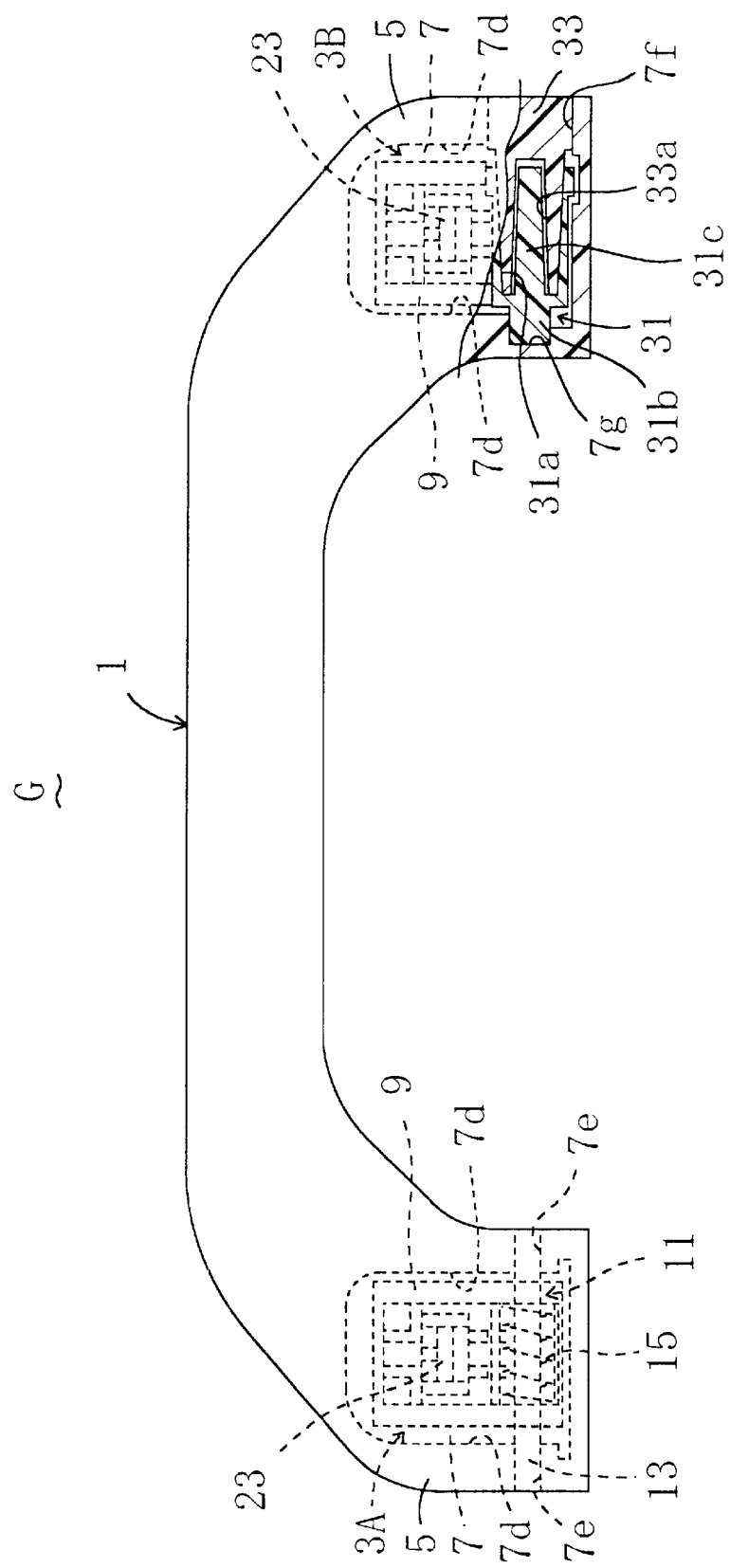
FIG. 7 is a general view of the assist grip.

As shown in FIG. 1, the left-hand mount 3A as viewed in FIG. 7 has a mount body 9 protruding toward the passenger room. The mount body 9 is formed in the shape of a rectangular box formed of a bottom wall 9a and sidewalls 9b. In the sidewalls 9b, a recess 9c open to the passenger room is formed. The lower end of the sidewall 9b forming one side (right-hand side in FIG. 1) of the mount body 9 is formed with an entrance 9d allowing for entry of the pusher 7c of the leg 5 therein. Side edges on both sides of the entrance 9d form stops 9e abuttable on the respective abutments 7b of the leg 5. On swinging the grip body 1 from retracted to use position, the abutments 7b abut on the stops 9e to hold the grip body 1 against further swing motion and in a horizontal attitude at the use position (see FIG. 11).

Figure 5:
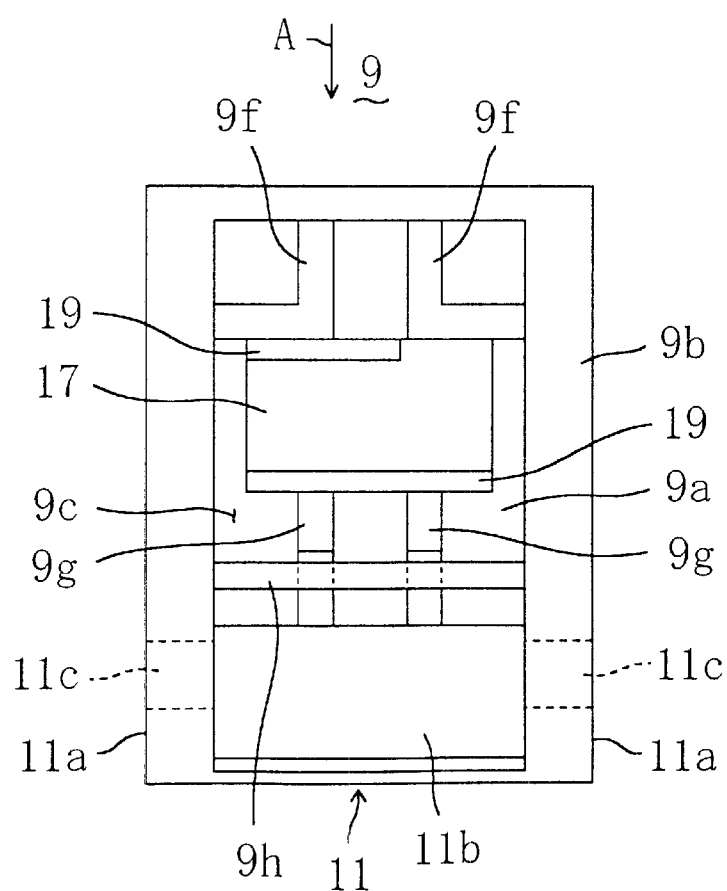
FIG. 5 is a plan view of the mount for an assist grip according to Embodiment 1.

As also shown in FIG. 5, two raised portions 9f of L-shape as viewed from above for preventing the locking member from dropping down into the through hole 17 are juxtaposed in one end portion (left-hand portion as viewed in FIG. 1 or upper end portion as viewed in FIG. 5) of the bottom wall 9a. Further, in a portion of the bottom wall 9a laterally away from the raised portions 9f (right-hand portion as viewed in FIG. 1 or lower portion as viewed in FIG. 5), another two raised portions 9g of substantially triangular as viewed from sidewise for preventing the locking member from dropping down into the through hole 17 are juxtaposed in spaced relation to the raised portions 9f. The raised portions 9g located on the right side as viewed in FIG. 1 (the lower side as viewed in FIG. 5) are formed at side surfaces closer to the entrance 9d into inclined surfaces. The inclined surfaces act as a guide for smooth upward movement of a movement assist piece 27a described later of the locking member 23 as shown in FIG. 1.

In the left-hand mount 3A as viewed in FIG. 7, a laterally protruding section formed of three sidewalls 9b above the entrance 9d as viewed in FIG. 1 constitutes a swing support section 11. As shown in FIG. 5, the swing support section 11 consists of a pair of pin supports 11a and a connecting part 11b for connecting the pair of pin supports 11a. The pair of pin supports 11a are formed with pin receiving holes 11c, respectively. A pin 13 is inserted into the two pin receiving holes 11c and both ends of the pin 13 are inserted into the right and left support holes 7e of the leg 5. Thereby, the grip body 1 is supported for swing motion to the mount body 9. A torsion coil spring 15 is disposed on the pin 13. The torsion coil spring 15 is anchored at its one end to the connecting part 11b of the swing support section 11 and at the other end, through it is not shown, to the lower end of the leg 5. By the torque of the torsion coil spring 15, the grip body 1 is urged into swing motion from use to retracted position and the mount body 9 can be accommodated in the accommodating section 7 in the retracted position of the assist grip (see FIG. 12).

The recess 9c of the mount body 9 is divided into two sections by a partition 9h. The swing support section 11 is provided at one side (right side in FIG. 1 or lower side in FIG. 5) of the partition 9h. A portion of the bottom wall 9a located at the other side (left side in FIG. 1 or upper side in FIG. 5) of the partition 9h is formed with a rectangular through hole 17 passing between the raised portions 9f and 9g of the bottom wall 9a from front to back (from upper to lower side as viewed in FIG. 1). On the periphery of the through hole 17 on the back of the bottom wall 9a of the mount body 9, a pair of engaging pieces 19, which can be inserted into the panel opening p1 of the inner panel P to engage on the edge of the panel opening p1, are oppositely projected to extend lengthwise of the grip body 1 (see FIGS. 2 and 8 to 12). Engaging pawls 19a which engage the periphery of the panel opening p1 of the inner panel P from the back side of the inner panel P to prevent the drop-out of the mount body 9 from the inner panel P are each formed at the distal end of the associated engaging piece 19 so as to extend lengthwise of the engaging piece 19 and protrude in a direction orthogonal to the lengthwise direction of the engaging piece 19 (outwardly from the through hole 17). On the back of the pawl 19a of one (right-hand one in FIG. 1) of the engaging pieces 19, a projection 19b is formed for retaining the locking member 23 in its locking position. Further, on the back of the bottom wall 9a of the mount body 9, two abutment pieces 21 are extended beside the engaging pieces 19. The abutment pieces 21 abut on the periphery of the panel opening p1 of the inner panel P from the front side of the inner panel P when the assist grip is mounted to the inner panel P.

Figure 2:
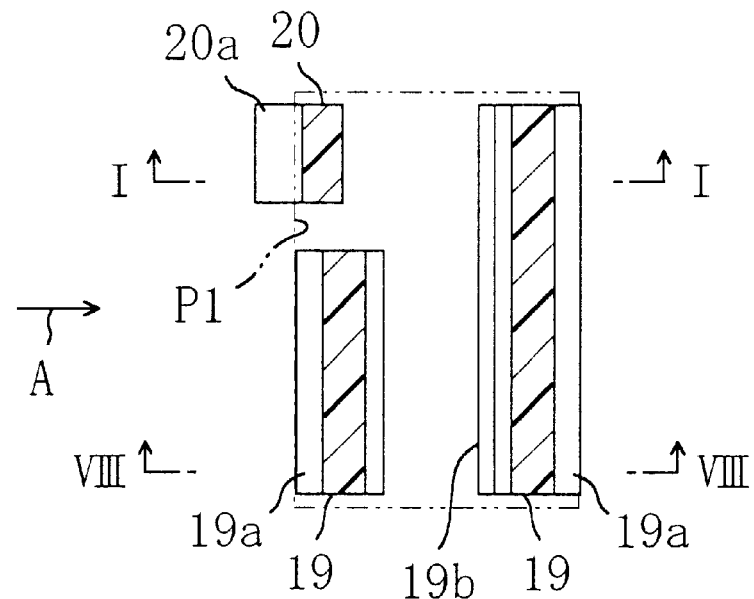
FIG. 2 is a cross-sectional view taken along the line II—II of FIG. 1 for illustrating the positional relationship among engaging pieces, a provisional retention piece and a panel opening.

As shown in FIG. 2, one (left-hand one in FIG. 2) of the engaging pieces 19 has a shorter dimension in the lengthwise direction of the grip body 1 than that of the other engaging piece 19 (right-hand one in FIG. 2). The pair of engaging pieces 19 and the panel opening p1 have such a positional relationship that when the engaging pieces 19 are inserted into the panel opening p1, the engaging pieces 19 come into slight or no contact with the edge of the panel opening p1 so as to scarcely experience resistance to insertion.

As a feature of this embodiment, on the side of the mount body 9 where the shorter engaging piece 19 (left-hand one in FIG. 2) is located, a provisional retention piece 20 is provided which is independent of and separated from the engaging piece 19, and the provisional retention piece 20 is formed with a provisional retention pawl 20a which projects in the same direction of projection of the engaging pawl 19a and which engages the periphery of the panel opening p1 from the back side of the inner panel P. Specifically, the provisional retention piece 20 is provided on the opposite side to an axis C2 of swing motion of the grip body 1 with respect to the center C1 of mounting of the assist grip G (the center of the panel opening p1). Further, the provisional retention pawl 20a extends outward beyond the edge of the panel opening p1 to overlie the periphery of the panel opening p1 (see FIG. 2). In mounting the assist grip G in the panel opening p1 of the inner panel P, the provisional retention piece 20 is inserted together with the engaging pieces 19 into the corresponding panel opening p1, passes through the panel opening p1 by moving their pawls 20a toward the inside of the panel opening p1 while slidingly contacting them with the edge of the panel opening p1. After the passage through the panel opening p1, the provisional retention piece 20 restores to its position overlying the periphery of the panel opening p1 by its own restoring force to engage the periphery of the panel opening p1 from the back side thereof, thereby provisionally retaining the mount 3A, 3B to the inner panel P (see FIGS. 1 and 10).

The pair of engaging pieces 19 are pushed apart from each other by the resin-made locking member 23. The locking member 23 consists of a plate-shaped rod 25, a rectangular cap 27 integrally formed at the root end of the rod 25, and three extensions 29a, 29b, 29c (see FIG. 3) integrally formed at the distal end of the rod 25 at intervals spaced lengthwise of the grip body 1. The extension 29a located at a lower end as viewed in FIG. 3 extends on both lateral sides so as to correspond to the pair of engaging pieces 19, and has a width longer than the distance between the engaging pieces 19. In other words, the extension 29a and the pair of engaging pieces 19 have such a positional relationship as to overlap in an unconstrained position of the pair of engaging pieces 19 where the locking member 23 has not yet pushed the engaging pieces 19 apart from each other (see FIG. 3).

Figure 3:
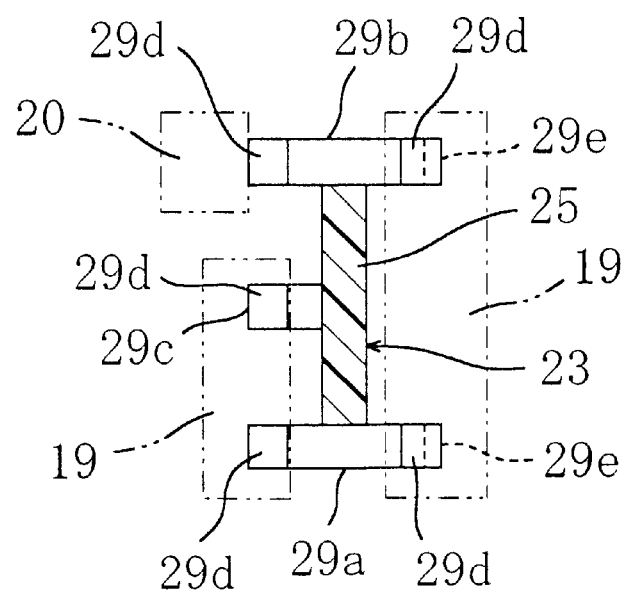
FIG. 3 is a cross-sectional view taken along the line II—II of FIG. 1 for illustrating the positional relationship among the engaging pieces, the provisional retention piece and a locking member.
Figure 4:
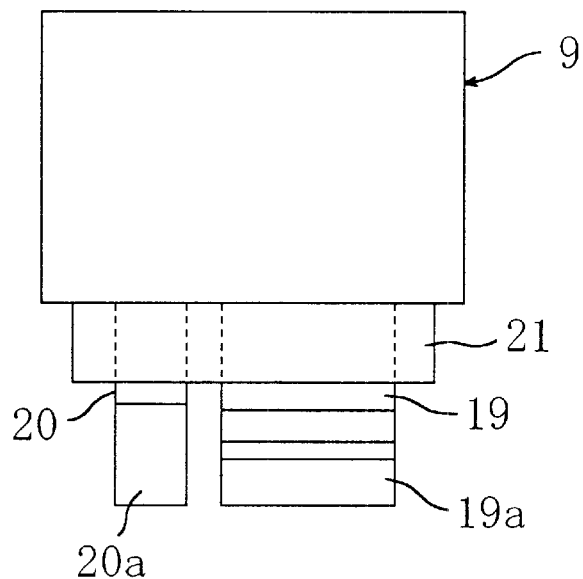
FIG. 4 is a side view of the mount when viewed in the direction of arrow A of FIGS. 2 and 5.

The extension 29b located at an upper end as viewed in FIG. 3 has the same configuration as the extension 29a located at the lower end, and extends on both lateral sides so as to correspond to the right-hand engaging piece 19 and the left-hand provisional retention piece 20. In other words, the extension 29b and the right-hand engaging piece 19 have such a positional relationship as to overlap in an unconstrained position of the pair of engaging pieces 19 where the locking member 23 has not yet pushed the engaging pieces 19 apart from each other, like the relationship between the extension 29a and the engaging pieces 19, and the extension 29b and the provisional retention piece 20 have such a positional relationship as to come into slight or no contact with each other in an unconstrained position of the provisional retention piece 20 (see FIG. 3).

The extension 29c located at an intermediate position as viewed in FIG. 3 has a configuration approximately half as large as those of the other extensions 29a and 29b, and extends only on one lateral side so as to correspond to the left-hand engaging piece 19. In other words, the extension 29c and the left-hand engaging piece 19 have such a positional relationship as to overlap in the unconstrained position of the pair of engaging pieces 19 where the locking member 23 has not yet pushed the engaging pieces 19 apart from each other (see FIG. 3). Furthermore, guide surfaces 29d for smoothly press-inserting the extensions 29a, 29b and 29c between the engaging pieces 19 are formed by cutting away the upper and lower end corners of these extensions.

One-side halves (right-hand halves in FIG. 1) of the extensions 29a and 29b extending on both lateral sides are each formed with a locking retention notch 29e for seating the locking retention projection 19b of the pawl 19a of the engaging piece 19 therein. A movement assist piece 27a is integrally extended from the cap 27 through a thinning portion 27b. The movement assist piece 27a is rockable with respect to the cap 27 through the thinning portion 27b. Before inserting the locking member 23 into the through hole 17, the movement assist piece 27a is in parallel with the cap 27 (at its uppermost position) as shown in dash-single-dot lines in FIG. 8. In inserting the locking member 23 into the through hole 17, the movement assist piece 27a lies along the partition 9h (at its intermediate position) as shown in dash-double-dot lines in FIG. 8 with the push thereof by the operator. Further, when the locking member 23 is fully inserted into the through hole 17 to the extent that engages the bottom of the cap 27 to the raised portions 9f, 9g of the bottom wall 9a, the movement assist piece 27a is located between the raised portions 9g and the partition 9h as shown in solid lines in FIG. 8. In mounting the assist grip G to the inner panel P, the swing motion of the grip body 1 to the use position causes the pusher 7c to abut on the movement assist piece 27a and push the locking member 23 in the opposite direction of the insertion into the through hole 17 as shown in FIG. 11.

Figure 8:
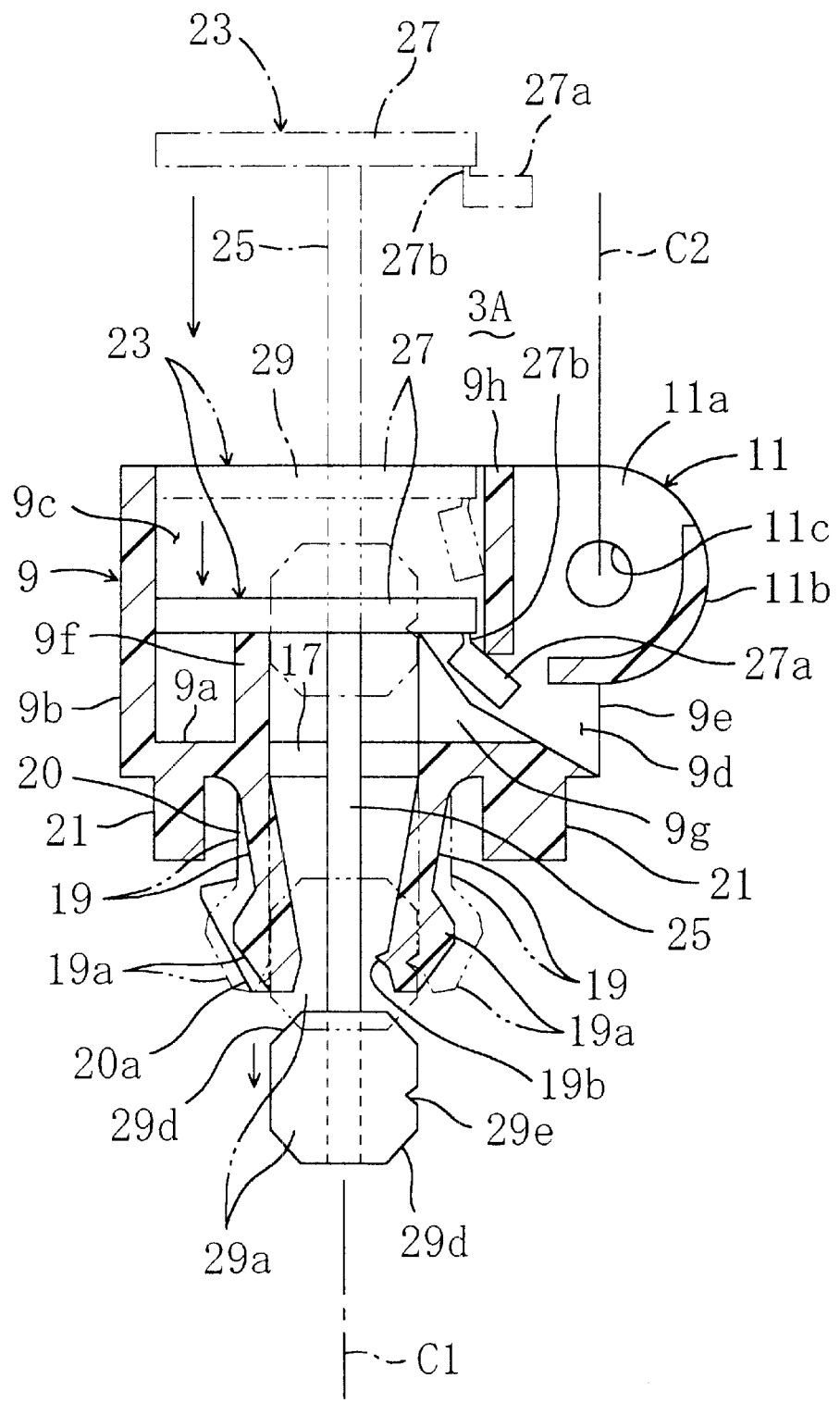
FIG. 8 is a cross-sectional view taken along the line VIII—VIII of FIG. 2 for illustrating how the locking member is mounted to the mount.

Before the mounts 3A, 3B are carried in the car body assembly line, the locking member 23 is previously inserted into the through hole 17 of the mount body 9 against dropping out therefrom. Specifically, prior to the mounting of the grip body 1 to the mounts 3A and 3B, the locking member 23 is inserted into the through hole 17 from the front side. During this insertion, the extensions 29a, 29b, 29c at the distal end thereof pass between the pair of engaging pieces 19 and between the opposed engaging piece 19 and provisional retention piece 20 while pushing the opposed pieces apart from each other. After the passage of the extensions 29a, 29b, 29c over the engaging and provisional retention pieces, the distance between the distal ends of the engaging pieces 19 is narrowed. By the narrowed distance between the distal ends of the engaging pieces 19, the extensions 29a, 29b, 29c are restrained against movement in the opposite direction of the insertion into the through hole 17 and held at a position having passed over the locking retention projection 19b (outside of the pawls 19a) as shown in FIG. 8. Further, in mounting the mount body 9 in which the locking member 23 is inserted as described above, namely, the assist grip G of which the grip body 1 is mounted to the mounts 3A and 3B (see FIG. 9), to the inner panel P in the car body assembly line, the abutment pieces 21 of the mount body 9 are caused to abut on the respective peripheries of the panel openings p1 of the inner panel P from the front side thereof as shown in FIG. 10, and in this state the grip body 1 is swung toward its use position. The pusher 7c of the leg 5 thereby pushes up the movement assist piece 27a so that the locking member 23 is moved back in the opposite direction of the insertion into the through hole 17. Through this backward movement of the locking member 23, the extensions 29a, 29b, 29c go back and enter between the pair of engaging pieces 19 and between the opposed engaging piece 19 and provisional retention piece 20 while pushing these opposed pieces apart from each other, and the locking retention projection 19b of the pawl 19a then seats in the locking retention notches 29e of the extensions 29a and 29b. The extensions 29a, 29b and 29c are thus retained at the locking position between the engaging pawls 19a so that the locking member 23 is held in locking condition with the engaging pieces 19 held engaged on the edge of the panel opening p1 of the inner panel P. Further, in this condition, the extension 29b abuts on the back of the provisional retention piece 20 thereby serving as a stop for blocking the movement of the provisional retention piece 20 opposite to a direction of engagement.

The right-hand mount 3B as viewed in FIG. 7 is different from the left-hand mount 3A in their hinge structures for mounting the grip body 1 for swing motion. However, the other structures are the same as in the left-hand mount 3A. Specifically, in the right-hand mount 3B, the mount body 9 is provided with a bottomed cylindrical swing support section 31 for supporting the right-hand leg 5 as viewed in FIG. 7 for swing motion. The swing support section 31 includes a recess 31a diminishing its diameter toward the bottom (the left side as viewed in FIG. 7). A fulcrum pin 31b is extended outwardly from the bottom of the swing support section 31. A loose-fit pin 31c diminishing its diameter toward its distal end (to the right side in FIG. 7) is extended from the inner bottom of the recess 31a in coaxial relation with the fulcrum pin 31b. A spacer 33 diminishing its diameter toward its distal end (to the left side in FIG. 7) is inserted at its root end into a spacer fitting hole 7f of the right-hand leg 5. In the spacer 33, a pin loose-fitting part 33a diminishing its diameter toward its bottom (to the right side in FIG. 7) is formed from the distal to root end of the spacer 33. The spacer 33 is inserted into the recess 31a of the swing support section 31 with a space left therebetween. The loose-fit pin 31c of the swing support section 31 is inserted into the pin loose-fitting part 33a with a space left therebetween. These two spaces form a continuous single space. A viscidity (not shown) made of a high-viscosity (preferably, 100,000 cps or more) liquid such as silicon is encapsulated in the continuous space, thereby forming a damper for producing torque acting as resistance against the swing motion of the grip body 1. By action of this damper, when swung from use to retracted position, the grip body 1 can return slowly to the retracted position against torque of the torsion coil spring 15.

Next, the procedure for mounting the assist grip G having the above structure to the inner panel P will be described with reference to FIGS. 8 to 12.

First, the movement assist piece 27a of the cap 27 of the locking member 23 is turned at the thinning portion 27b from the position shown in dash-single-dot lines in FIG. 8 to the position shown in dash-double-dot lines in FIG. 8 in the direction of insertion. In this condition, the locking member 23 is inserted into the through hole 17 of the mount body 9 from the front side thereof and pushed thereinto until the back face of the cap 27 abuts on the raised portions 9f, 9g. During this insertion, since no restriction is present outside of the pair of engaging pieces 19, the extensions 29a, 29b, 29c at the distal end of the locking member 23 pass between the pair of engaging pieces 19 and between the opposed engaging piece 19 and provisional retention piece 20 while pushing the opposed pieces apart from each other, pass over the pair of engaging pawls 19a located at the locking position, and then moves outside beyond the distal ends of the pawls 19a (see solid lines in FIG. 8). In this case, though the locking retention projection 19b temporarily seats in the locking retention notches 29e of the extensions 29a and 29b, this seating engagement is released by a force of inserting the locking member 23 and the locking member 23 is further inserted. After the extensions 29a and 29b have passed over the engaging pieces 19, the engaging pieces 19 pushed apart from each other are released from the pressing forces of the extensions 29a and 29b and regain its original position of narrow distance by its own restoring forces. In this condition, the locking member 23 is not only restrained against further movement in the direction of insertion since the back of the cap 27 abuts on the raised portions 9f and 9g, but also restrained against movement opposite to the direction of insertion since the extensions 29a, 29b and 29c abut on the distal ends of the engaging pawls 19a. As a result, the extensions 29a and 29b are retained outside of the distal ends of the pawls 19a.

In this manner, the locking member 23 can be held against drop-out from the through hole 17 of the mount body 9 and therefore can be prevented from being lost before the mounts 3A, 3B are carried in the car body assembly line. Accordingly, lack of parts and a difficult pulling work of the locking member 23 falling into locking condition are eliminated. This avoids a serious impediment to a smooth flow of the car body assembly line.

During the insertion of the locking member 23, the movement assist piece 27a moves guidedly along the partition 9h and is then presented between the partition 9h and the raised portions 9g.

Figure 9:
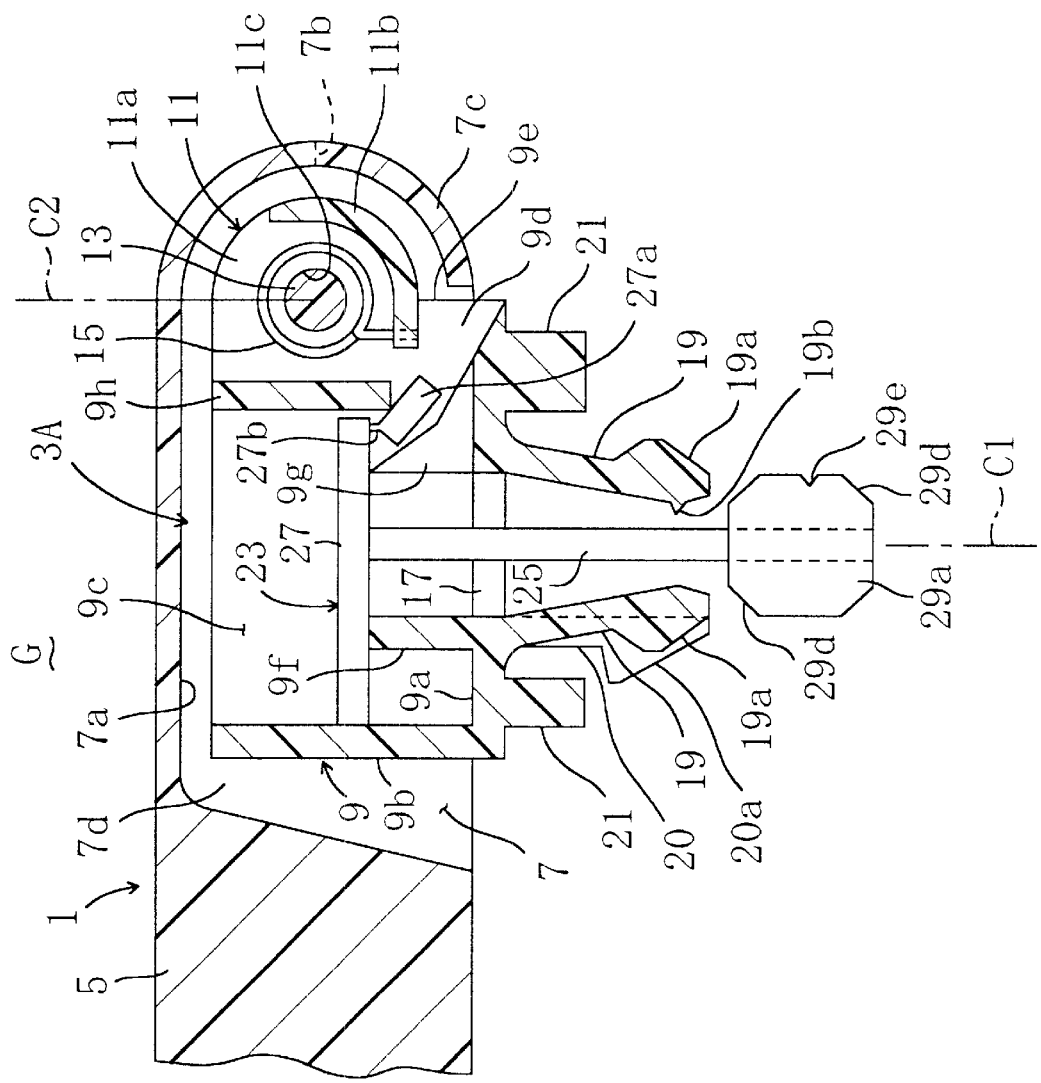
FIG. 9 is a cross-sectional view taken along the line VIII—VIII of FIG. 2 for illustrating the state that the grip body has been mounted to the mount.
Figure 10:
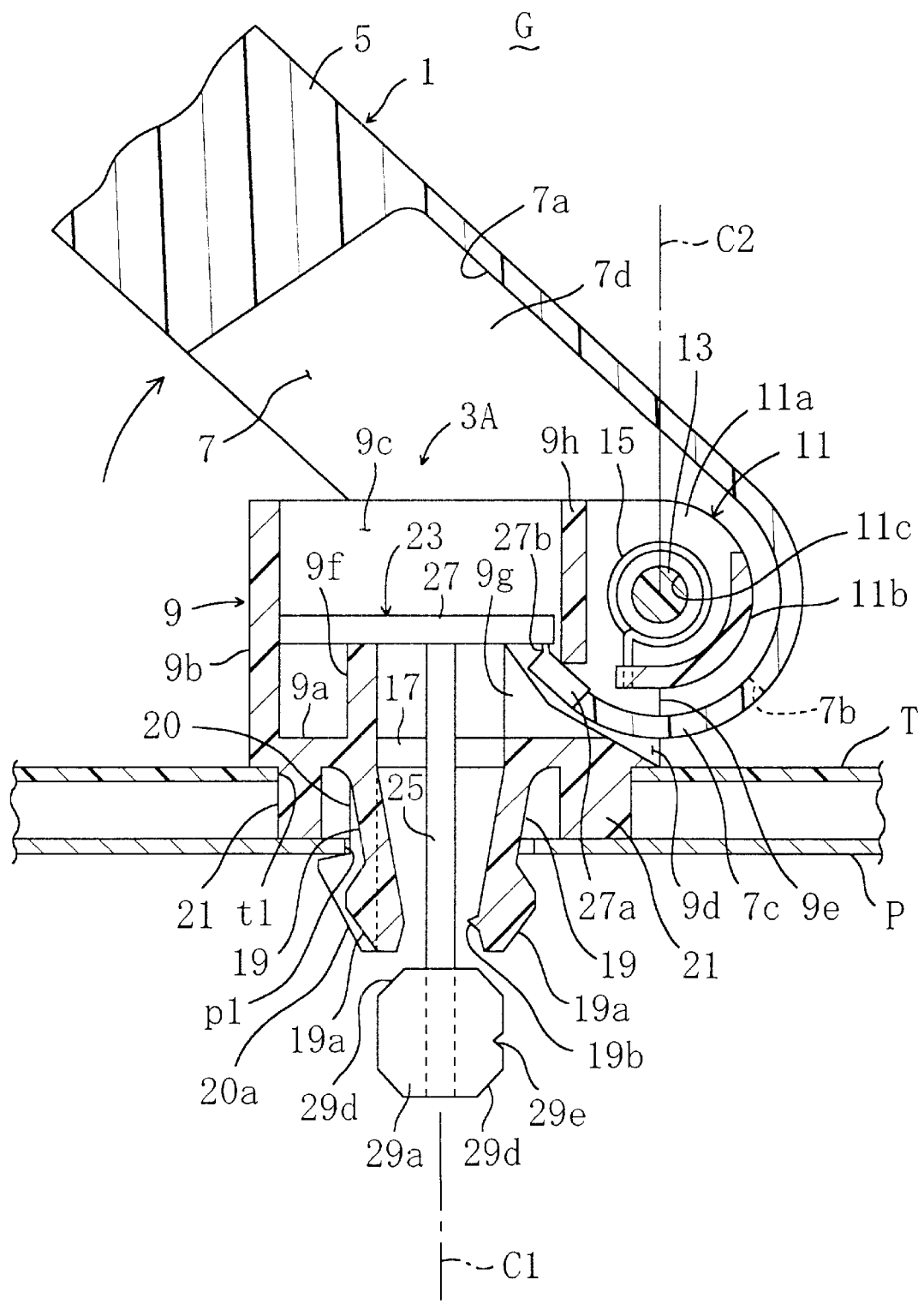
FIG. 10 is a cross-sectional view taken along the line VIII—VIII of FIG. 2 for illustrating an initial state of swing motion of the grip body toward its use position.

Next, the grip body 1 is mounted to the mounts 3A, 3B in which the locking member 23 has been assembled in the mount body 9 in the above manner, thereby forming the assist grip G as shown in FIG. 9. Since the mount 3A shown in FIGS. 8 to 12 is the left-hand one shown in FIG. 7, the torsion coil spring 15 is disposed on the pin 13 of the swing support section 11 in FIG. 9. On the other hand, in the right-hand mount 3B as viewed in FIG. 7, the spacer 33 is inserted into the swing support section 31, thereby providing a damper function. In this condition, the grip body 1 takes a retracted position with respect to the mounts 3A, 3B by the torque of the torsion coil spring 15 (see FIG. 9).

Thereafter, as shown in FIG. 10, the mounts 3A and 3B of the assist grip G are inserted into the corresponding openings t1 of the ceiling member T to engage the abutment pieces 21 of the mount body 9 to the periphery of the corresponding panel opening p1 of the inner panel P from the front side thereof, and concurrently the pair of engaging pieces 19 are inserted into the panel opening p1. During the time, since the extensions 29a, 29b and 29c of the locking member 23 have passed over the engaging pieces 19 and the provisional retention piece 20 and the engaging pieces 19 are free from the pressing force of the extensions 29a, 29b and 29c, the distance between the pawls 19a of the pair of engaging pieces 19 and the distance between the engaging piece pawl 19a and the provisional retention piece pawl 20a are narrowed and the engaging pieces 19 come into slight or no contact with the edge of the panel opening p1. Further, in inserting the engaging pieces 19 into the panel opening p1, the provisional retention piece 20 is moved into the panel opening p1 while bringing the provisional retention pawl 20a thereof into sliding contact with the edge of the panel opening p1 and passes through the panel opening p1. After passing over the panel opening p1, the provisional retention piece 20 restores, by its own restoring force, to position at which its pawl 20a and the periphery of the panel opening p1 overlap, and the pawl 20a engages the periphery of the panel opening p1 from the back side thereof to provisionally retain the mount 3A, 3B to the inner panel P.

As described above, in inserting the pair of engaging pieces 19 into the panel opening p1, the engaging pieces 19 are brought into slight or no contact with the edge of the panel opening p1. Therefore, the engaging pieces 19 scarcely experience resistance to insertion but the provisional retention piece 20 of small size exclusively experiences it. Accordingly, even if the provisional retention piece 20 of small size has a high rigidity, it is easily flexed as compared with the case of making provisional retention by using the engaging pieces entirely without a dedicated provisional retention piece and provides ease and reliable provisional retention of the mount 3A, 3B with a small insertion, resulting in increased working efficiency.

Further, this provisional retention prevents disengagement of the mount 3A, 3B from the inner panel P. Therefore, in fixing the assist grip G to the inner panel P, there can be smoothly performed a mounting work of the assist grip G to the inner panel P without concern of disengagement.

Thereafter, as shown in FIG. 11, the grip body 1 is swung to its use position. Through this swing motion, the pusher 7c of the leg 5 enters inside of the mount body 9 through the entrance 9d and moves the movement assist piece 27a of the locking member 23 in the opposite direction of the insertion of the locking member 23. During the time, the inclined surfaces of the raised portions 9g guide the movement assist piece 27a of the locking member 23 for smooth movement and prevents separation of the pusher 7c from the movement assist piece 27a.

Furthermore, through the movement of the locking member 23 opposite to the direction of insertion, the extensions 29a, 29b and 29c thereof enter between the pair of opposed engaging pieces 19 and between the opposed engaging piece 19 and provisional retention piece 20 and push the opposed pieces apart from each other, the locking retention projection 19b of the engaging piece 19 seats in the locking retention notches 29e of the extensions 29a and 29b to retain the extensions 29a, 29b and 29c at their locking positions between the opposed engaging pawls 19a and the opposed engaging pawl 19a and provisional retention pawl 20a, and the pawls 19a of the engaging pieces 19 are thereby held engaged on the periphery of the panel opening p1. During the time, the locking member 23 comes into slight or no contact with the provisional retention piece 20. Therefore, the provisional retention piece 20 scarcely experiences resistance to insertion but the engaging pieces 19 exclusively experience it. Accordingly, the engaging pieces 19 can be smaller in size by a portion corresponding to the provisional retention piece 20 as compared with the case of using the engaging pieces only without the provisional retention piece. Consequently, even if the engaging pieces 19 of small size have high rigidities, they are easily flexed and provide ease and reliable full retention of the mount 3A, 3B with a small insertion, resulting in increased working efficiency.

Moreover, the provisional retention piece 20 is provided on the opposite side to the axis C2 of swing motion of the grip body 1 with respect to the center C1 of mounting of the assist grip G (the center of the panel opening p1). Therefore, when the grip body 1 has been swung from a position to provisionally retain the mounts 3A and 3B to the inner panel P to the use position of the assist grip G, the pawl 20a of the provisional retention piece 20 is engaged against the back face of the inner panel P so that the provisional retention piece 20 will not be disengaged from the periphery of the panel opening p1. Accordingly, the assist grip G can be mounted in the panel opening p1 with reliability.

Then, when the grip body 1 is released, it returns to the retracted position as shown in FIG. 12 by the torque of the torsion coil spring 15 and the damping effect. From this point, even when the grip body 1 is swung again to the use position, the pusher 7c of the leg 5 no longer moves the movement assist piece 27a of the locking member 23 in the opposite direction of the insertion of the locking member 23. Accordingly, the locking member 23 neither drops out nor interferes with the swing motion of the grip body 1.

As can be seen from the above, by simply swinging the grip body 1 to the use position, the extensions 29a, 29b and 29c of the locking member 23 can automatically be pushed to the locking position (between the pair of opposed engaging pawls 19a and between the opposed engaging pawl 19a and provisional retention pawl 20a) to push the engaging pieces 19 apart from each other and engage the engaging pieces 19 on the edge of the panel opening p1. Accordingly, the assist grip G can be easily mounted to the inner panel P in a single operation. In addition, in order to mount the assist grip G to the inner panel P, it suffices to prepare the grip body 1 and the mounts 3A and 3B with locking members 23, which form the assist grip G, and other mounting jigs and parts are dispensed with. This presents cost reduction.

(Embodiment 2)

FIGS. 13 to 18 show an assist grip G to which mounts 3A and 3B according to Embodiment 2 are applied. This embodiment is different from Embodiment 1 in that the provisional retention pawl 20a of the provisional retention piece 20 is extended lengthwise of the engaging piece 19, that the locking member 23 includes a stop 29f, extended from the extension 29b, for blocking movement of the provisional retention piece 20 opposite to a direction of engagement by abutment of the stop 29f on the back face of the provisional retention piece 20, and that one of the raised portions 9f of the mount body 9 is formed with a slit 9j for preventing the stop 29f from interfering with the raised portion 9f in inserting the locking member 23 into the through hole 17. The other structures of this embodiment are the same as in Embodiment 1.

Accordingly, this embodiment provides the same effects and operations as in Embodiment 1.

Each of the foregoing embodiments describes, as an example, the case where the provisional retention piece 20 is provided only on one side of the pair of engaging pieces 19. However, if the provisional retention pieces 20 are provided on both sides of the pair of engaging pieces 19, provisional retention property can be improved.

Further, in each of the foregoing embodiments, the engaging pawls 19a are extended one from each of the pair of engaging pieces 19. However, the pawl 19a may be extended from either one of the engaging pieces 19 and the other engaging piece 19 may be formed with an engaging groove into which the edge of the panel opening p1 is fitted to engage the engaging piece 19 with the edge of the panel opening p1.

In the above embodiments, the extensions 29a, 29b and 29c of the locking member 23 are retained at the locking position (between the opposed engaging pawls 19a and between the opposed engaging pawl 19a and provisional retention pawl 20a) by seating the locking retention projection 19b of the pawl 19a in the locking retention notches 29e of the extensions 29a and 29b of the locking member 23. Alternatively, the cap 27 of the locking member 23 may be provided with a dropout preventing (locking retention) piece having a pawl and the pawl of the dropout preventing piece is engaged in an engaging window formed in the sidewall 9b of the mount body 9 so that the extensions 29a, 29b and 29c of the locking member 23 can be retained at the locking position (between the opposed engaging pawls 19a and between the opposed engaging pawl 19a and provisional retention pawl 20a)

In addition, a concavity may be provided in either one of the end of the movement assist piece 27a of the locking member 23 and the end of the pusher 7c of the leg 5 of the grip body 1, a corresponding convexity may be provided in the other, and the concavity and convexity may be fitted with each other. In this manner, in moving the locking member 23 opposite to the direction of insertion, the pusher 7c is held engaged with the movement assist piece 27a. This ensures that the locking member 23 is moved to its locking position.

Furthermore, in the above embodiments, the locking member 23 is retained at its locking position by moving the locking member 23 from back to front of the inner panel P in association with swing motion of the grip body 1 to the use position. Alternatively, the locking member 23 may be retained at its locking position, contrarily, by moving the locking member 23 from front to back of the inner panel P in association with swing motion of the grip body 1 to the retracted position as done in the prior art. Further, the present invention can be applied not only to the retractable assist grip such as the above embodiments the legs of which are mounted for swing motion but also to the fixed type assist grip the legs of which are mounted against swing motion. In the latter assist grip, unlike the retractable assist grip, the locking member can be manually press-inserted between the engaging pieces through the through hole of the mount body by using a pressing jig.

What is claimed is:

1. A mount for an assist grip wherein the assist grip comprises: a grip body with legs at both lengthwise ends; a pair of mounts each having a mount body onto which one of the legs of the grip body is mounted for or against swing motion, the mount body being provided with a pair of engaging pieces extending lengthwise of the grip body; and a locking member for locking and holding the engaging pieces in position apart from each other through press-insertion thereof between the pair of engaging pieces to move the engaging pieces apart from each other, and when the assist grip is mounted to a car body panel through panel openings of the car body panel, the pair of engaging pieces are inserted into the corresponding panel opening and the locking member is then press-inserted between the pair of engaging pieces so that the engaging pieces moved apart from each other by the press-insertion of the locking member are held engaged on the edge of the panel opening, said mount for an assist grip characterized in that on at least one of both sides of the mount body where the pair of engaging pieces are located, a provisional retention piece is provided which is independent of and separated from the engaging piece, and in mounting the assist grip to the car body panel through the panel openings, the provisional retention piece is inserted together with the engaging pieces into the corresponding panel opening and thereby engaged on the edge of the panel opening to provisionally retain the mount onto the car body panel.

2. The mount for an assist grip of claim 1, characterized in that at least one of the pair of engaging pieces is provided with an engaging pawl, the engaging pawl extending lengthwise of the engaging piece, projecting in a direction orthogonal to the lengthwise direction of the engaging piece and engaging the periphery of the panel opening, and the provisional retention piece is provided with a provisional retention pawl, the provisional retention pawl projecting in the same direction of projection of the engaging pawl and engaging the periphery of the panel opening.

3. The mount for an assist grip of claim 1, characterized in that at least one of the pair of engaging pieces is provided with an engaging pawl, the engaging pawl extending lengthwise of the engaging piece, projecting in a direction orthogonal to the lengthwise direction of the engaging piece and engaging the periphery of the panel opening, and the provisional retention piece is provided with a provisional retention pawl, the provisional retention pawl projecting lengthwise of the at least one engaging piece and engaging the periphery of the panel opening.

4. The mount for an assist grip of any one of claims 1 to 3, characterized in that the locking member is provided with a stop which is abuttable, when the assist grip is mounted to the car body panel through the panel openings, on a back face of the provisional retention piece to block movement of the provisional retention piece opposite to a direction of engagement.

* * * * *